Jan. 7, 1958      R. C. GREENAWAY      2,818,772
MOVIE PHONOGRAPH
Filed March 7, 1955      3 Sheets-Sheet 1
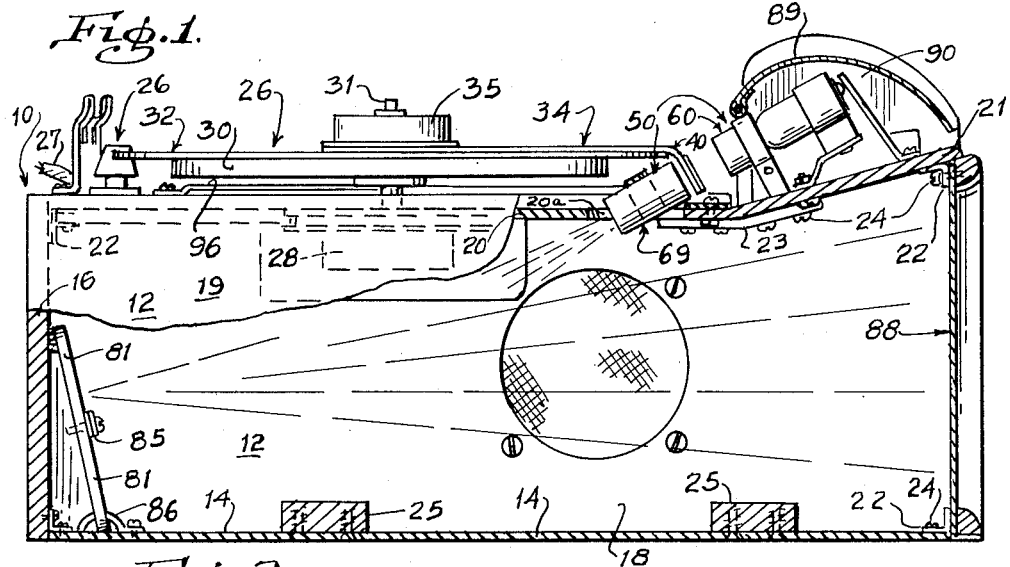
Fig. 1.
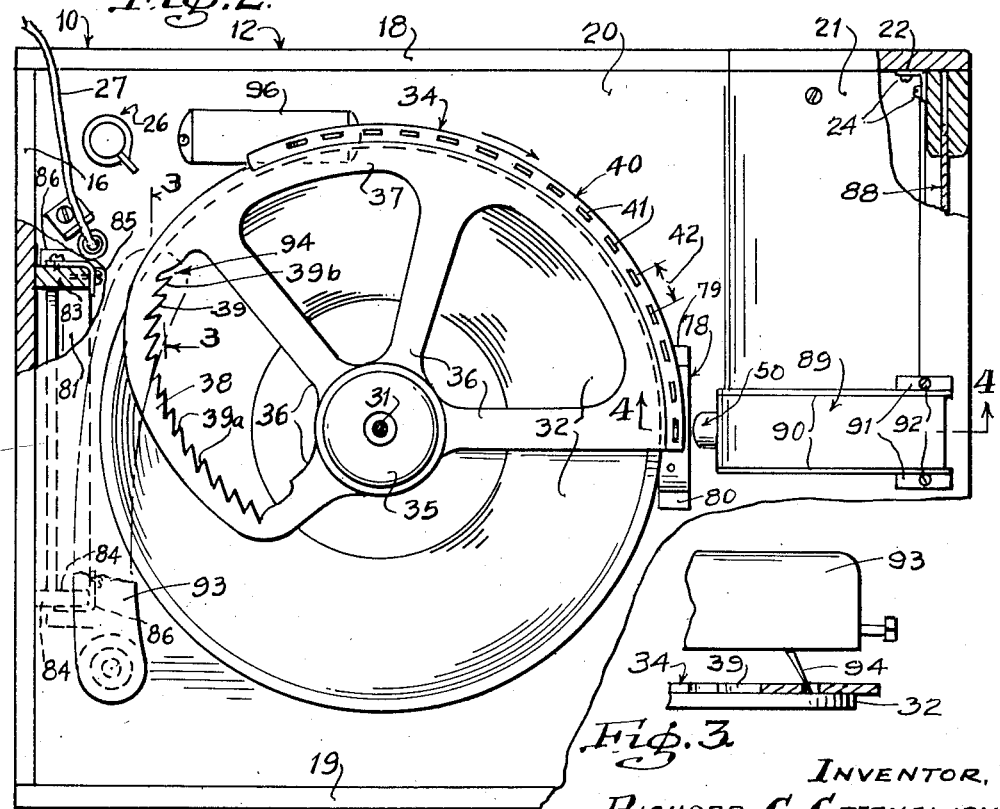
Fig. 2.
Fig. 3.
INVENTOR.
RICHARD C. GREENAWAY
By Leonard A. Weinberg
ATTORNEY.

Jan. 7, 1958 R. C. GREENAWAY 2,818,772
MOVIE PHONOGRAPH

Filed March 7, 1955 3 Sheets-Sheet 2

INVENTOR,
RICHARD C. GREENAWAY
BY Leonard D. Winberg
ATTORNEY.

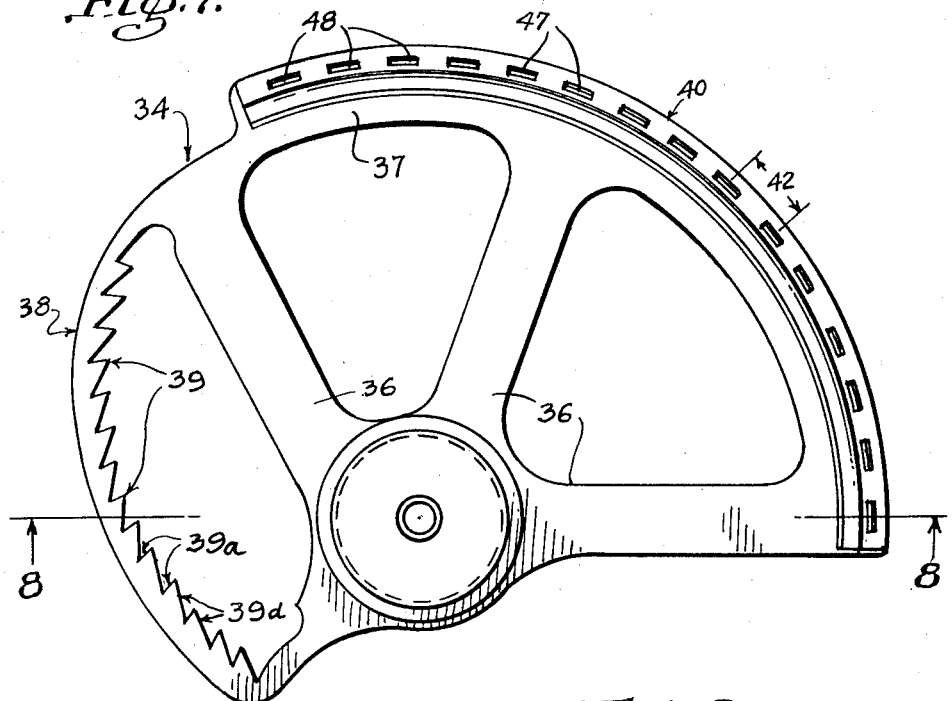
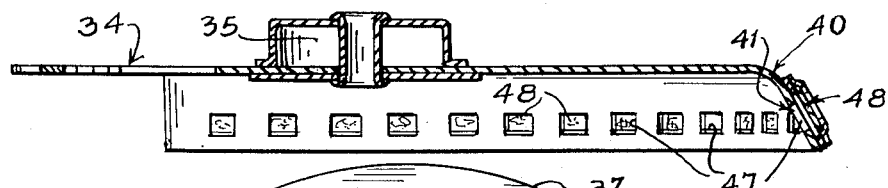
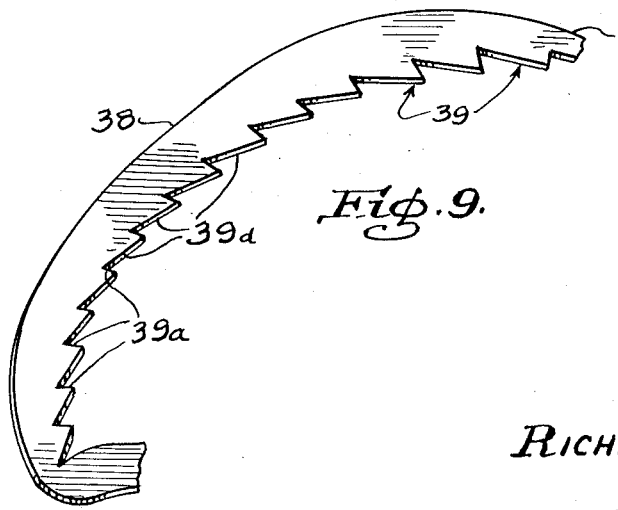
INVENTOR.
RICHARD C. GREENAWAY
By
ATTORNEY.

United States Patent Office 2,818,772
Patented Jan. 7, 1958

2,818,772

MOVIE PHONOGRAPH

Richard C. Greenaway, Los Angeles, Calif., assignor to Monarch Records Incorporated, Los Angeles County, Calif., a corporation of California Application March 7, 1955, Serial No. 492,582

1 Claim. (Cl. 88—27)

This invention relates to an amusement device which embodies a conventional phonograph having added means for projecting a series of small movie frames or pictures onto a screen to illustrate the subject matter of the record. The movement of the pictures past the projector lenses is synchronized with the music or dialogue emanating from the record, so as to insure the matching of picture and sound. This is a primary object of the invention.

Another object of the invention is to provide a simple, practical device, mounted on the record which will successively move a series of pictures on said device past a projector at a speed that is predetermined by the coaction of the phonograph needle and the said device.

A further object is to provide a compact, portable unit that houses a conventional record playing unit and a reflecting mirror, screen and projector unit.

An important object is to provide a simple device that may be used by a child for amusement or education, and one that may also be used for lectures, sales talks, music language and technical lessons or the like.

Other objects and advantages of the invention will become apparent as the specification proceeds.

In the drawings: Fig. 1 is a side elevation of the amusement device with parts broken away to show the enclosed mirror and screen.

Fig. 2 is a plan view of the device of Fig. 1 with parts shown in section.

Fig. 3 is a vertical sectional view taken on line 3—3 of Fig. 2.

Fig. 7 is a plan view of the change disc used to provide successive frames for the projector.

Fig. 8 is a vertical sectional view taken on the line 8—8 of Fig. 7.

Fig. 9 is a partial perspective view of the control strip on the change disc.

Figure 4:
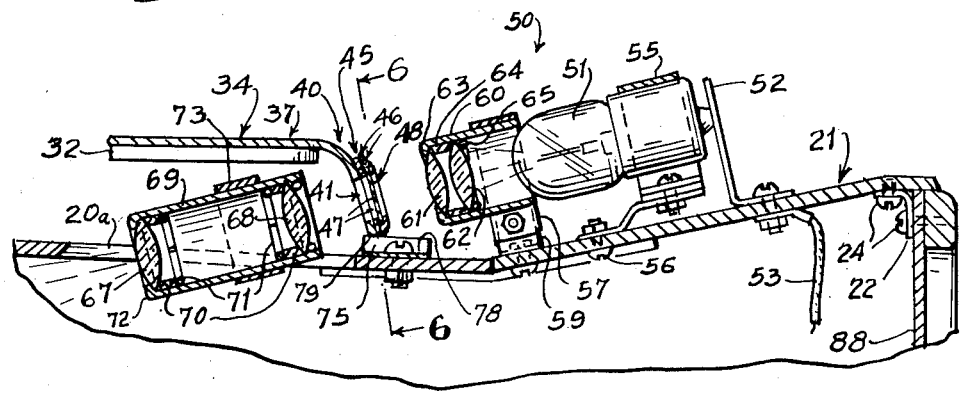
Fig. 4 is a vertical sectional view taken on line 4—4 of Fig. 2.
Figure 5:
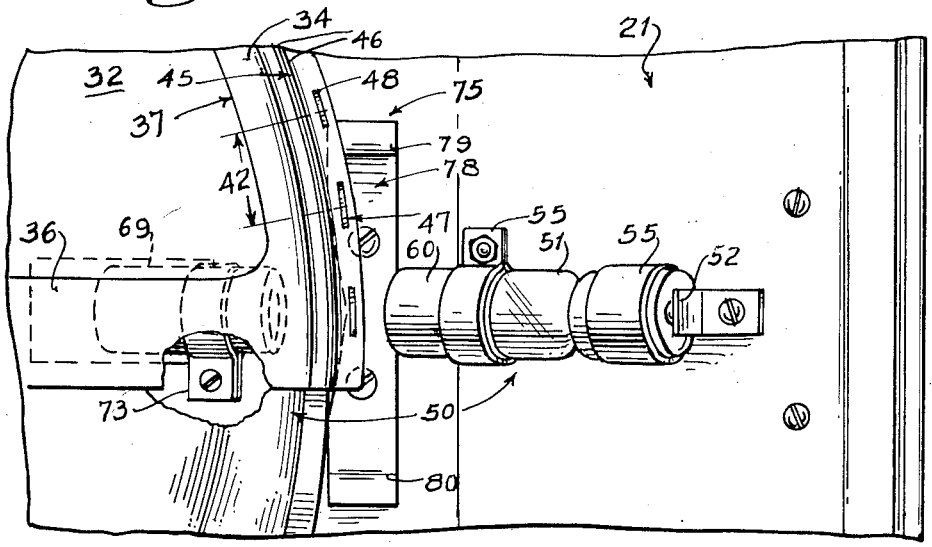
Fig. 5 is a partial plan view showing the parts of Fig. 4.
Figure 6:
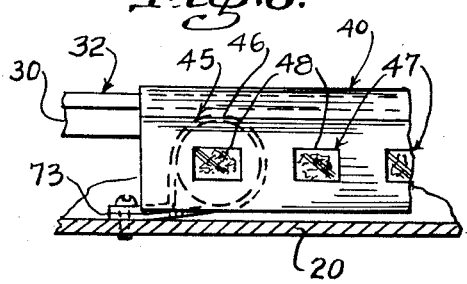
Fig. 6 is a vertical sectional view taken on line 6—6 of Fig. 4.

Numeral 10 designates the amusement device, the same having a box-like cabinet or housing 12, consisting of a bottom wall 14, an end wall 16, side walls 18 and 19 and a top wall 20 having an inclined portion 21. Cleats 22 and 23 and screws 24 are used to removably fasten the top wall 20 and bottom wall 14. Transverse braces 25 may be used between side walls 18 and 19 to strengthen the housing 12.

As shown in Fig. 1, a conventional phonograph unit 26 having a lead-in cord 27 adapted to supply current to an electric drive unit 28 is provided to actuate the turn table 30. A spindle 31 projecting through the turn table 30 is adapted to receive the central aperture of a record 32. Mounted upon spindle 31 and resting upon record 32 is a change disc 34 having a hollow hub 35 adapted to receive said spindle and provide a stable bearing. Radial arms 36 extend from hub 35 to connect with a circular rim 37 which engages the outer periphery of the record 32 for approximately 120 degrees and then continues upon the top of the record as a flat inwardly curved strip 38. The said strip 38 curves in a spiral manner toward and terminates adjacent to the innermost groove of record 32.

The strip 38 of change disc 34 is provided along its inner curved edge with ratchet-like notches or teeth 39 the same having a retaining edge 39a which slopes downwardly toward the left and a connecting edge, 39d.

The change disc 34 where it engages the outer periphery of record 32 is provided with a flange 40 which extends downwardly and outwardly at a small angle. The flange 40 is provided with equal rectangular apertures 41 having a pre-determined spacing 42 which is controlled by the length of connecting edges 39d.

As shown in Fig. 4, the flange 38 is provided with a picture band 45 consisting of a pair of strips 46 having apertures 47 adapted to register with apertures 41. Small pictures 48 are held between the strips 46 in register with apertures 40 and 47 and in axial alinement with a projecting unit 50.

The projecting unit 50 consists of a light bulb 51 connected by contact 52 and wire 53 to a suitable source of current. Bulb 51 is mounted on bracket 55 fixed to inclined wall 21 by a bolt and nut 56.

Between bulb 51 and picture band 45 is a bracket 57 pivotally fixed at 58 to a fitting 59 on a wall 21. Bracket 57 has a lens holder 60 in which is mounted a pair of condensing lenses 61 and 62 said lenses being held in position by inturned lip 63, spacer 64, and snap ring 65. Light bulb 51 extends a short distance within lens holder 60 to insure accurate alinement.

Mounted on wall 20 on the side of the picture band 45 opposite to lenses 61 and 62 and in alinement therewith, is a projector consisting of lenses 67 and 68 mounted in lens holder 69, said lenses being held in position by spacers 70, snap ring 71, and lip 72. A bracket 73 holds the lens holder 69 on wall 20, said holder extending into slot 20a of said wall. A guide member 75 is mounted on wall 20 by screws 76 and nuts 77. Guide 75 consists of a flat central portion 78 and a pair of raised legs 79 and 80 adapted to form as shown in Fig. 4, a rest and guide for the picture band 45 to hold the successive pictures in alinement for projection.

A reflecting mirror 81 is mounted within housing 12 on bottom wall 14 whence it inclines against end wall 16 and in alinement with the lenses of the projecting unit 50. The mirror 81 is held in inclined position by bars 83 and 84 on wall 16, the said bars having fittings 85 and 86 to aid in holding said mirror.

A screen 88 held by cleats 22 and screws 24 forms the end wall opposite to wall 16 and receives the projected real image of pictures 48 successively. A hood 89 serves to conceal and protect lens holder 60, said hood having side walls 90 provided with feet 91 which are fixed to wall 21 by screws 92.

As shown in Figs. 1 and 2, the conventional phonograph unit 26 is provided with a sound arm 93 having a needle 94.

*Operation*

To operate the device, a record is chosen having the subject matter which fills the need of the user. A change disc, 34, is also chosen for the purpose of moving the proper picture, 48, into position on the screen, 88, to illustrate the portion of the subject matter emanating from the record at the time.

To this end—see Figs. 2 and 3—the needle, 94, is placed in contact with strip, 38, so as to rest on retaining edge, 39a, of tooth, 39b, said tooth being in register with the first groove on record, 32. The needle, 94, is initially placed at the left end of non-radial edge, 39a, and as the record revolves, the needle moves inwardly on a radial line, toward the center of the record. When the subject matter progresses to a point where a new picture, 48, is required to illustrate the subject matter at hand, the needle, 94, moves radially beyond the point of tooth, 39b, and disengages from change disc, 34.

The record, 32, and change disc, 34, momentarily revolve together until needle, 94, engages the next tooth, at which time change disc, 34, stops revolving but continues to shift slightly, not enough to affect the viewing of the picture on screen 88, but sufficiently to prevent the sticking of disc 34 to the record 32 and required picture is in position in the projecting unit, 50. The aforesaid operation is repeated until the last tooth, 39c, has been utilized simultaneously with the last picture, 48. It is evident that the length of connecting edge, 39d, determines the spacing, 42.

An auxiliary friction clutch, 96, as shown in Figs. 1 and 2, may be used if desired.

From the foregoing it is evident that this invention provides a compact, portable unit that may be used for amusement or educational purposes by children or adults. The change disc, 34, may be made with equal or irregular teeth, and numerous changes may be made in the size, shape and arrangement of the parts may be made without departing from spirit of the invention or the scope of the appended claim.

I claim:

A device of the kind described comprising a cabinet having a bottom wall, an end wall, side walls, a top wall having an inclined portion, a phonograph unit, including a needle, mounted on said top wall, said unit including a motor, a turn table driven by said motor, a spindle projecting beyond said turn table, a record mounted on said turn table and having an aperture to receive said spindle, a change disc mounted on said record, said disc having a hub for reception of said spindle, a rim engaging said record for substantially one third of its circumference, said rim having a plurality of teeth, the same including a non-radial edge adapted to maintain contact with said needle for a predetermined length of time and a connecting edge, a depending flange having apertures spaced at a predetermined distance apart, a picture band on said flange, said band having apertures in register with the apertures of said flange, pictures carried by said band in alignment with said apertures, the indexing of said pictures controlled by said connecting edge, a projecting unit on the inclined surface of said top wall, an auxiliary projector unit on the opposite side of said picture band, said unit being mounted in an opening in said top wall and extending into said cabinet, a reflector mirror mounted on the bottom and end walls of said cabinet and in alignment with said picture and projecting units, and a screen in the opposite end wall to receive the projected real image of said picture.

References Cited in the file of this patent

UNITED STATES PATENTS

| | | |
|---|---|---|
| 1,584,708 | Billings | May 11, 1926 |
| 1,658,030 | Adams | Feb. 7, 1928 |
| 2,003,890 | Jones | June 4, 1935 |
| 2,584,421 | Brenchley et al. | Feb. 5, 1952 |
| 2,647,437 | Bentley et al. | Aug. 4, 1953 |
| 2,683,390 | Steele | July 13, 1954 |